(12) United States Patent
Ueda

(10) Patent No.: US 12,385,945 B2
(45) Date of Patent: Aug. 12, 2025

(54) BOARDING AND DEBOARDING DETECTION APPARATUS AND METHOD

(71) Applicant: TOYOTA JIDOSHA KABUSHIKI KAISHA, Toyota (JP)

(72) Inventor: Yoshiki Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 18/149,773

(22) Filed: Jan. 4, 2023

(65) Prior Publication Data

US 2023/0280368 A1    Sep. 7, 2023

(30) Foreign Application Priority Data

Mar. 3, 2022   (JP) ................... 2022-032671

(51) Int. Cl.
*G01P 15/18* (2013.01)
*B60W 40/08* (2012.01)
*G01P 15/08* (2006.01)

(52) U.S. Cl.
CPC ............. *G01P 15/18* (2013.01); *B60W 40/08* (2013.01); *G01P 15/0891* (2013.01)

(58) Field of Classification Search
CPC .... G01P 15/18; G01P 15/0891; B60R 21/015; B60W 40/08; B60W 2520/105; B60W 2530/00
See application file for complete search history.

(56) References Cited

U.S. PATENT DOCUMENTS

| | | | | |
|---|---|---|---|---|
| 2015/0014082 | A1* | 1/2015 | Kasper | B60T 7/12 180/282 |
| 2016/0332635 | A1* | 11/2016 | Holub | B60W 40/08 |
| 2018/0061207 | A1* | 3/2018 | Nygren | G01N 29/00 |
| 2018/0292570 | A1 | 10/2018 | Kawaguchi et al. | |
| 2019/0344738 | A1* | 11/2019 | Ga | B60R 21/01536 |
| 2021/0245706 | A1* | 8/2021 | Wada | B60R 25/34 |
| 2021/0403040 | A1* | 12/2021 | Nakanishi | G06Q 10/04 |
| 2022/0406173 | A1* | 12/2022 | Nakashima | G06V 20/52 |
| 2023/0202488 | A1* | 6/2023 | Zilberman | B60W 40/114 701/124 |

FOREIGN PATENT DOCUMENTS

JP    2018-179640 A    11/2018

* cited by examiner

*Primary Examiner* — Helen C Kwok
(74) *Attorney, Agent, or Firm* — Oliff PLC

(57) ABSTRACT

In a detection apparatus (boarding/exiting detection apparatus), an acquisition unit (second acquisition unit) acquires an acceleration of a vehicle in a period determined based on a first time point when a door of the vehicle is opened and a second time point when the door is closed after the first time point. A determination unit determines that a passenger of the vehicle gets on or gets off the vehicle, based on a temporal variation in the acceleration acquired.

10 Claims, 9 Drawing Sheets

BOARDING AND DEBOARDING DETECTION APPARATUS AND METHOD

The disclosure of Japanese Patent Application No. 2022-32671 filed on Mar. 3, 2022 including the specification, drawings and abstract is incorporated herein by reference in its entirety.

BACKGROUND

1. Technical Field

The present disclosure relates to detection apparatuses and detection methods.

2. Description of Related Art

JP2018-179640 discloses an occupant detection device comprising: an acceleration sensor to detect an acceleration of the vehicle; a photodetector unit that irradiates an internal space of the vehicle with light and detects a detection target on the basis of reflection light; and a determining unit that determines whether or not the detection target is a passenger on the basis of an acceleration detection result and a light detection result.

JP2018-179640 requires installing a photodetector unit in the vehicle and so may increase the number of components and the cost.

SUMMARY

A purpose of the present disclosure is to provide a technology capable of determining that a passenger of a vehicle gets on or gets off the vehicle with a simple configuration.

A detection apparatus according to one aspect of the present disclosure includes: an acquisition unit configured to acquire an acceleration of a vehicle in a period determined based on a first time point when a door of the vehicle is opened and a second time point when the door is closed after the first time point; and a determination unit configured to determine that a passenger of the vehicle gets on or gets off the vehicle, based on a temporal variation in the acceleration acquired.

Another aspect of the present disclosure relates to a detection method. The method includes: acquiring an acceleration of a vehicle in a period determined based on a first time point when a door of the vehicle is opened and a second time point when the door is closed after the first time point; and determining that a passenger of the vehicle gets on or gets off the vehicle, based on a temporal variation in the acceleration acquired.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Various embodiments now will be described. The embodiments are illustrative and are not intended to be limiting.

First Embodiment

Figure 1:
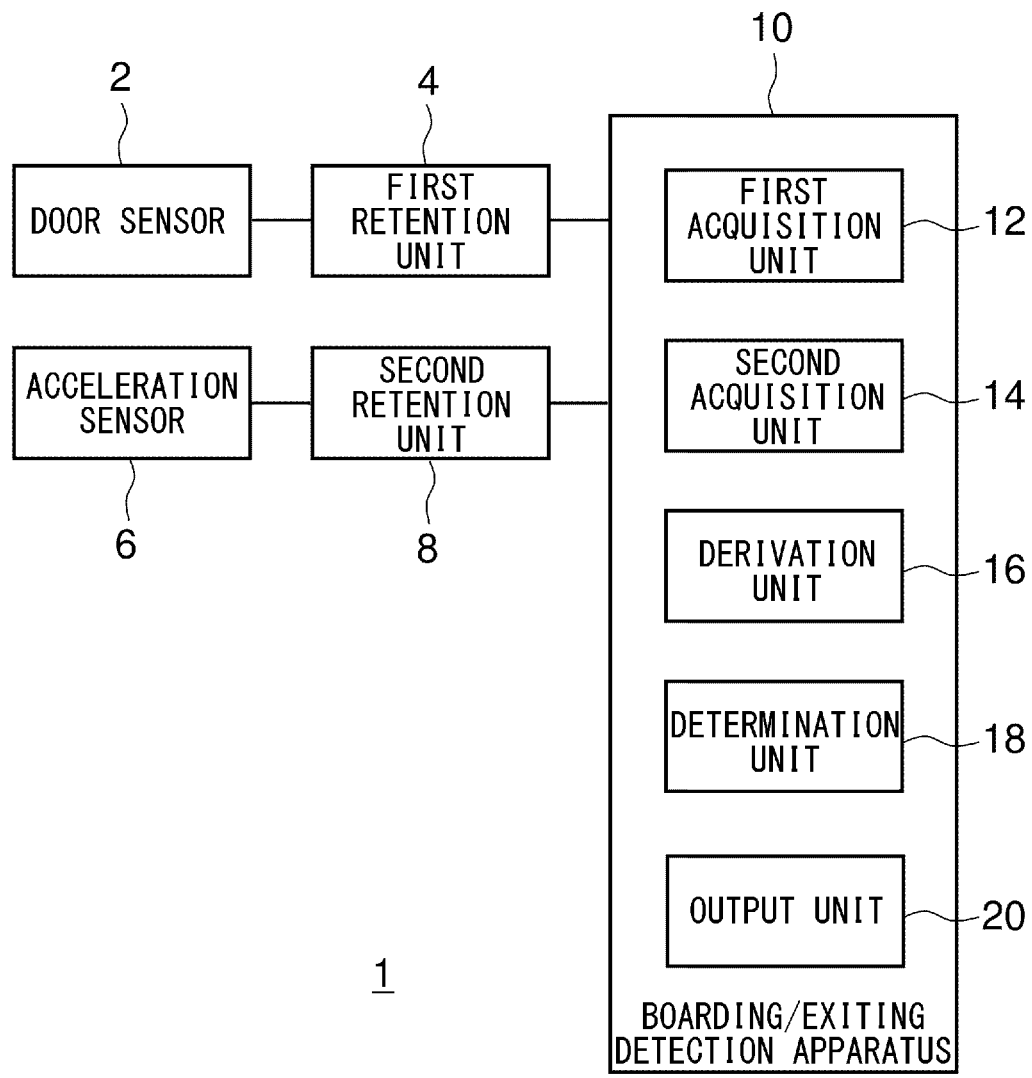
FIG. 1 shows a configuration of a detection system of the first embodiment.

FIG. 1 shows a configuration of a detection system 1 of the first embodiment. The detection system 1 is mounted on a vehicle to detect that a passenger gets on the vehicle or the passenger gets off the vehicle. The vehicle is not limited to any particular type and may be a business vehicle or a private vehicle, but a taxi is described as an example here.

The detection system 1 stores the time points when the taxi door is opened or when it is closed and time series data for acceleration of the taxi. At an arbitrary time point such as when the taxi returns to a station at, for example, the taxi company, the detection system 1 detects ex-post boarding or exiting of passengers based on the stored information. The server of the taxi company collects the results of detection of boarding and exiting from the detection system 1 of a plurality of taxis and analyzes the collected data.

The detection system 1 is provided with a door sensor 2, a first retention unit 4, an acceleration sensor 6, a second retention unit 8, and a boarding/exiting detection apparatus 10.

The door sensor 2 is provided in each of a plurality of doors of the vehicle to detect whether each door is in an open state or a closed state and supplies the results of detection to the first retention unit 4. The door sensor 2 is, for example, a courtesy switch for displaying an alert on a half-open door warning light and is an existing component of the vehicle.

The first retention unit 4 retains the time point when the door changes from a closed state to an open state and the time point when the door changes from an open state to a closed state, based on the results of detection by the door sensor 2. The information on the time points retained in the first retention unit 4 can be provided to the boarding/exiting detection apparatus 10. The first retention unit 4 is provided in, for example, a control apparatus for controlling display on the half-open door warning light and is an existing component of the vehicle.

The acceleration sensor 6 is provided in the vehicle to detect the acceleration of the vehicle and supplies the result of detection to the second retention unit 8. The acceleration sensor 6 can detect the acceleration in three axes including the acceleration in the longitudinal direction of the vehicle. The acceleration sensor 6 may detect the acceleration in two axes. The acceleration sensor 6 is used to, for example, control the vehicle and is an existing component of the vehicle.

The second retention unit 8 retains the time series data for acceleration detected by the acceleration sensor 6. Information on the time point of detection is attached to the data for acceleration. The information retained in the second retention unit 8 can be provided to the boarding/exiting detection apparatus 10. The second retention unit 8 is provided in, for example, a control apparatus for controlling the vehicle and is an existing component of the vehicle.

The boarding/exiting detection apparatus 10 detects that a passenger of the vehicle gets on or gets off the vehicle, based on the result of detection by the door sensor 2 and the result of detection by the acceleration sensor 6. The boarding/exiting detection apparatus 10 refers to the time point when the door is opened and the time point when it is closed to identify a time zone in which it is likely that boarding or exiting took place. The boarding/exiting detection apparatus 10 determines that a passenger gets on or gets off the vehicle based on the temporal variation in the acceleration produced by the variation in the inclination of the vehicle in that time zone. The boarding/exiting detection apparatus 10 is provided with a first acquisition unit 12, a second acquisition unit 14, a derivation unit 16, a determination unit 18, and an output unit 20.

The features of the boarding/exiting detection apparatus 10 are implemented in hardware such as a CPU, a memory, or other LSIs of an arbitrary computer and in software such as a program loaded into a memory. The FIG. depicts functional blocks implemented by the cooperation of these elements. Therefore, it will be understood by those skilled in the art that the functional blocks may be implemented in a variety of manners by hardware only, software only, or by a combination of hardware and software.

The first acquisition unit 12 acquires the first time point when the vehicle door is opened and the second time point when the door is closed for the first time after the first time point from the first retention unit 4 and supplies information on the acquired time points to the second acquisition unit 14. When a plurality of sets of the first time point and the second time point are acquired, the following process is performed for each pair of the first time point and the second time point.

The second acquisition unit 14 acquires the time series data for acceleration in the longitudinal direction of the vehicle in the period between the first time point and the second time point and supplies the acquired data to the derivation unit 16. The period from the first time point to the second time point is a period in which the door is open and represents a period defined based on the first time point and the second time point.

Figure 2:
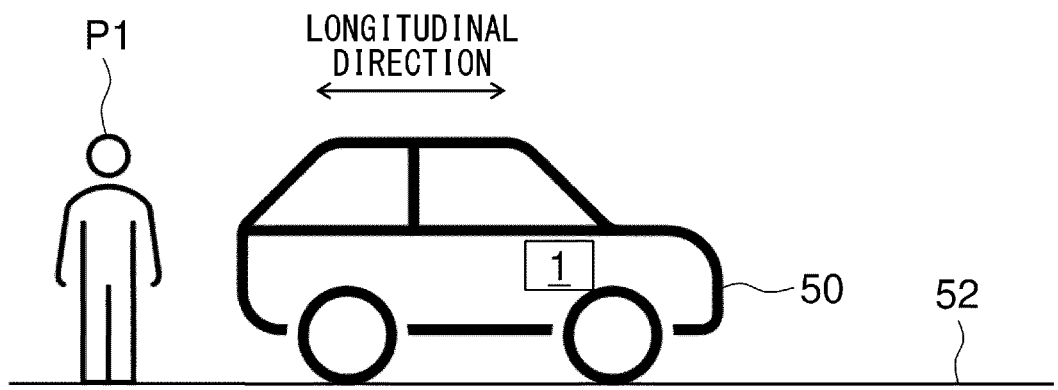
FIG. 2 is a side view showing a state occurring before a passenger gets on a vehicle provided with the detection system of FIG. 1.

FIG. 2 is a side view showing a state occurring before a passenger P1 gets on a vehicle 50 provided with the detection system 10 of FIG. 1. The vehicle 50, which is a taxi, is at a stop to let the passenger P1 get on the vehicle. It is assumed here that a ground 52 under the vehicle 50 is a surface perpendicular to the vertical direction and the longitudinal direction of the vehicle 50 is within a surface perpendicular to the vertical direction. Therefore, the acceleration of the vehicle 50 in the longitudinal direction is zero. The longitudinal direction of the vehicle 50 represents the longitudinal direction in the coordinate system fixed to the vehicle 50.

Figure 3:
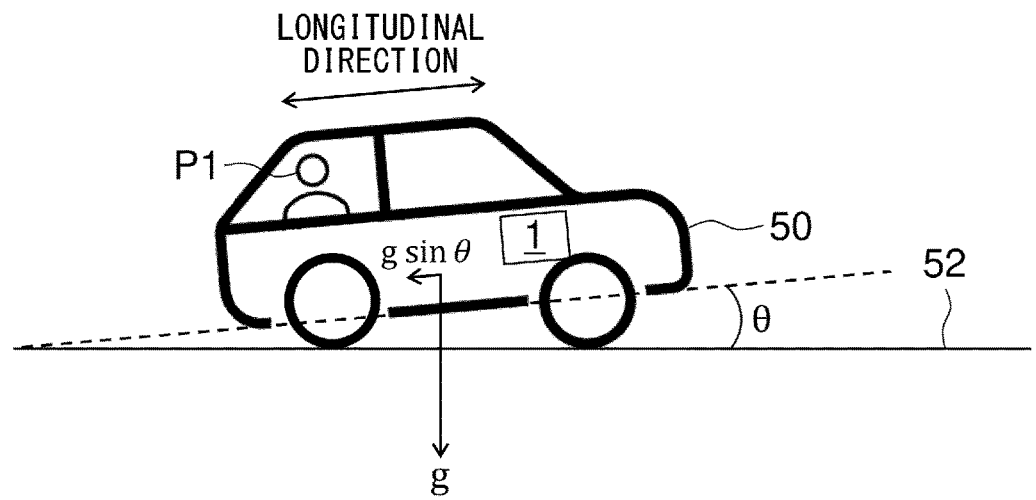
FIG. 3 is a side view showing a state in which the passenger is on board the vehicle of FIG. 2.

FIG. 3 is a side view showing a state in which the passenger P1 is on board the vehicle 50 of FIG. 2. It is assumed that the vehicle 50 is at a stop. Since the passenger P1 is seated in the rear seat of the vehicle 50, the vehicle 50 is inclined relative to the ground 52 due to the weight of the passenger P1, and the rear side of the vehicle 50 is lower than the front side. The angle of inclination of the vehicle 50 in the longitudinal direction relative to the surface perpendicular to the vertical direction, i.e., the pitching angle, is denoted by $\theta$. FIG. 3 shows the magnitude of $\theta$ in exaggeration.

Inclination of the vehicle 50 relative to the ground 52 increases the acceleration of the vehicle 50 in the longitudinal direction from zero to $g \times \sin \theta$. g denotes gravitation acceleration. In this case, rearward acceleration is defined to be positive, and forward acceleration is defined to be negative. By detecting the variation in the acceleration in the longitudinal direction, it is determined that the passenger P1 gets on or gets off the vehicle.

Figure 4:
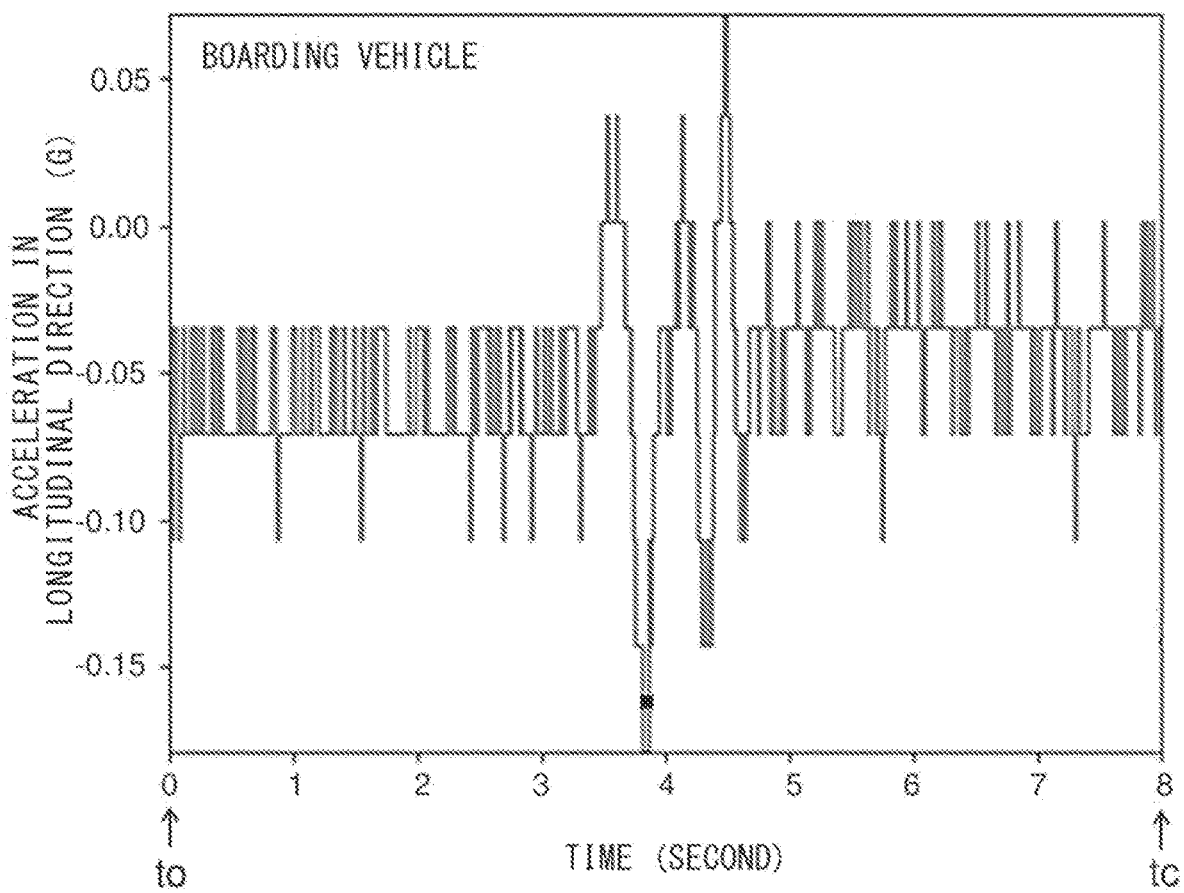
FIG. 4 shows an example of the time series data for acceleration in the longitudinal direction acquired by the second acquisition unit of FIG. 1 before and after the passenger gets on the vehicle.

FIG. 4 shows an example of the time series data for acceleration in the longitudinal direction acquired by the second acquisition unit 14 of FIG. 1 before and after the passenger gets on the vehicle. The vertical axis of FIG. 4 represents the acceleration in the longitudinal direction in G unit, and the horizontal axis represents the time elapsed since the first time point to. The second time point tc is defined at 8 seconds after. FIG. 4 shows an example in which the passenger gets on the vehicle between about 3 seconds and 5 seconds. Unlike the state of FIGS. 2 and 3, FIG. 4 shows an example in which the acceleration in the longitudinal direction is negative before a passenger gets on.

Figure 5:
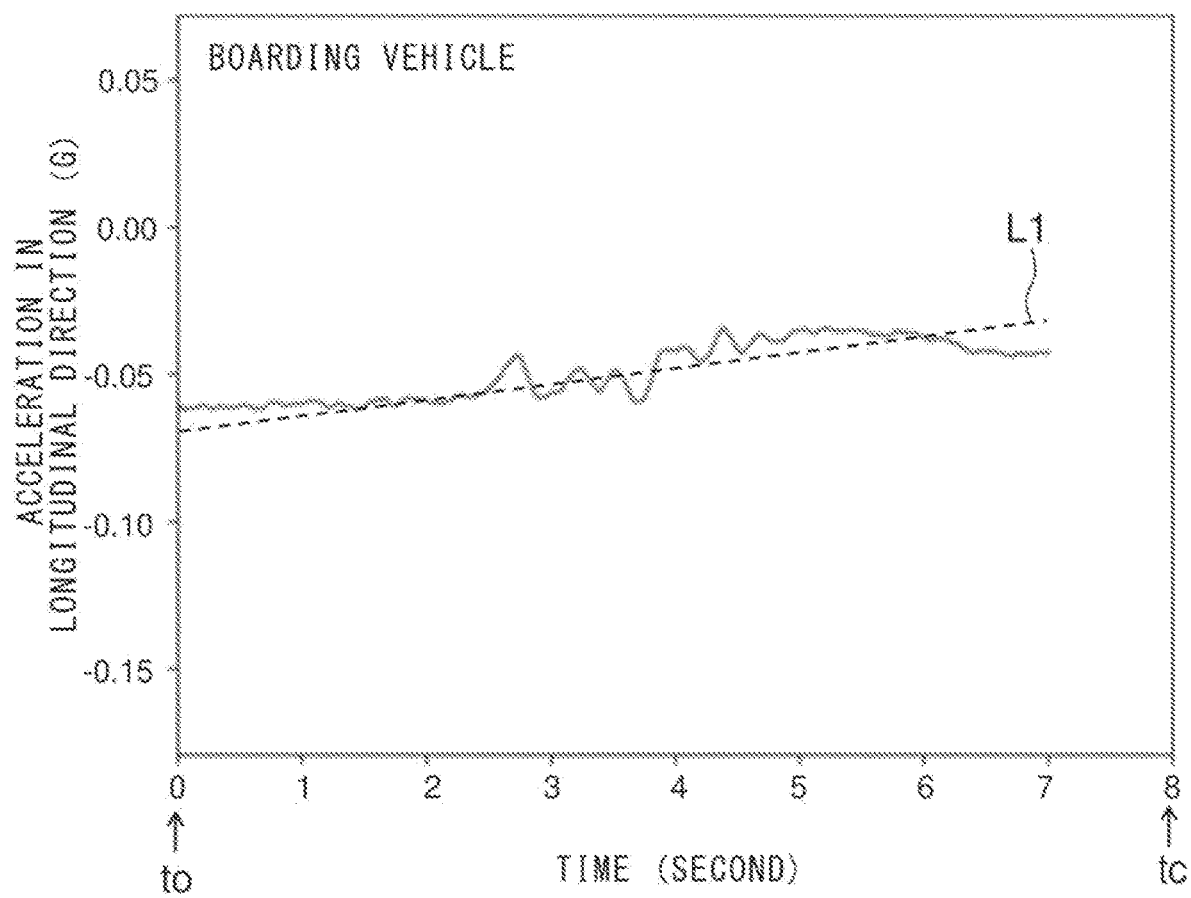
FIG. 5 shows an example of the moving average and the regression line of the time series data for acceleration of FIG. 4.

FIG. 5 shows an example of the moving average and the regression line L1 of the time series data for acceleration of FIG. 4. In FIG. 5, a one-second moving average is illustrated.

The derivation unit 16 derives an indicator X indicating the tendency of the variation in the acceleration in the longitudinal direction in the period from the first time point to and the second time point tc and supplies the derived indicator X to the determination unit 18. The indicator X indicates whether the acceleration in this period is on the increase or on the decrease. The indicator X can be said to show the tendency of the variation in the pitching angle $\theta$ of the vehicle in this period.

The derivation unit 16 derives the moving average in a predetermined segment in the time series data for acceleration between the first time point to and the second time point tc, subjects the time series data for the derived moving average to regression analysis, and derives the regression line L1 given by $y=ax+b$. The derivation unit 16 defines the inclination a of the regression line L1 as the indicator X.

The determination unit 18 determines whether a passenger of the vehicle gets on or gets off the vehicle based on the derived indicator X. The threshold value is set to 0, and the determination unit 18 determines that a passenger gets on the vehicle when the indicator X is larger than the threshold value and determines that a passenger gets off the vehicle when the indicator X is smaller than the threshold value. In other words, the determination unit 18 determines that a passenger gets on or gets off the vehicle depending on whether the acceleration is on the increase or on the decrease in the period from the first time point to to the second time point tc. The process is equivalent to the determination unit 18 determining that a passenger gets on or gets off the vehicle based on the temporal variation in the acceleration acquired by the second acquisition unit 14. In the example of FIG. 5, the indicator X is positive so that the determination unit 18 determines that a passenger gets on the vehicle.

Figure 6:
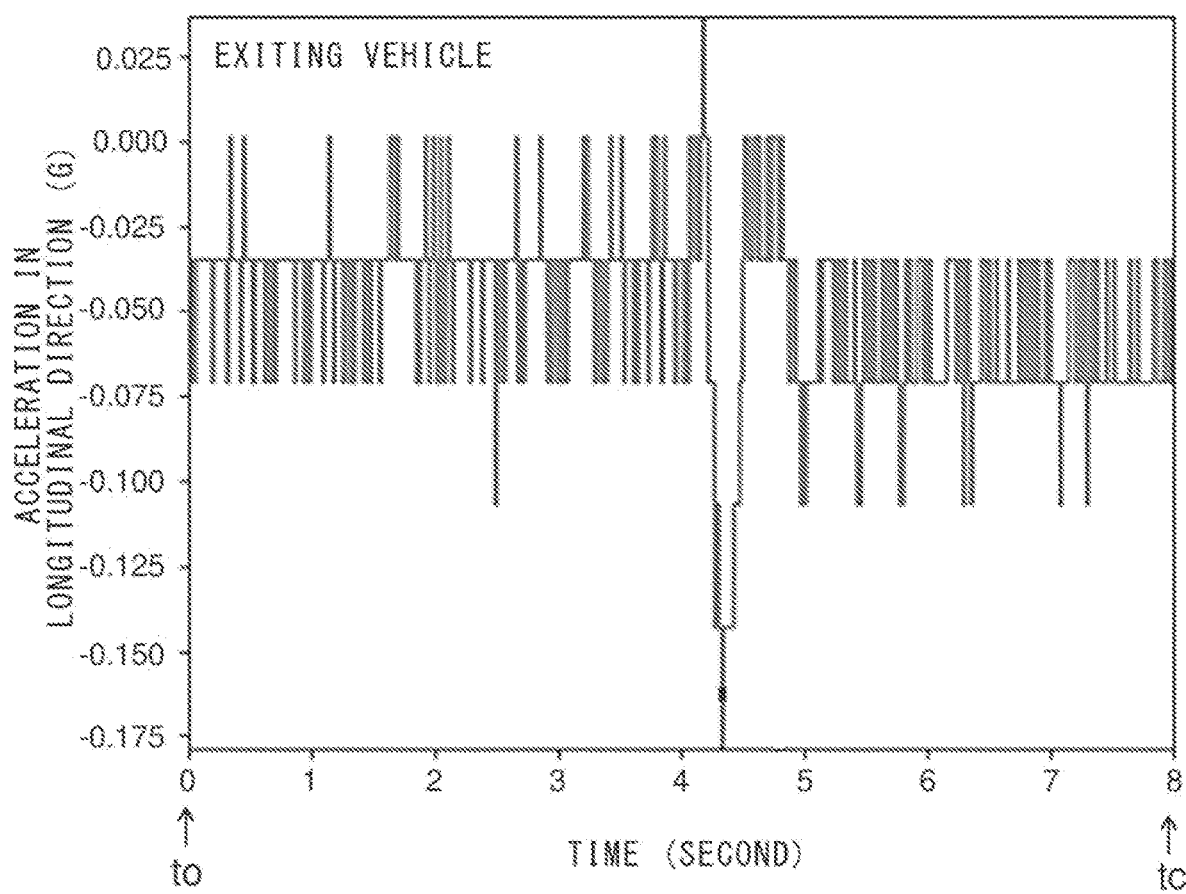
FIG. 6 shows an example of the time series data for acceleration in the longitudinal direction acquired by the second acquisition unit of FIG. 1 before and after a passenger gets off the vehicle.

FIG. 6 shows an example of the time series data for acceleration in the longitudinal direction acquired by the second acquisition unit 14 of FIG. 1 before and after a passenger gets off the vehicle. The vertical axis and the horizontal axis are as shown in FIG. 4. FIG. 6 shows an example in which the passenger gets off the vehicle between about 4 seconds and 5 seconds.

Figure 7:
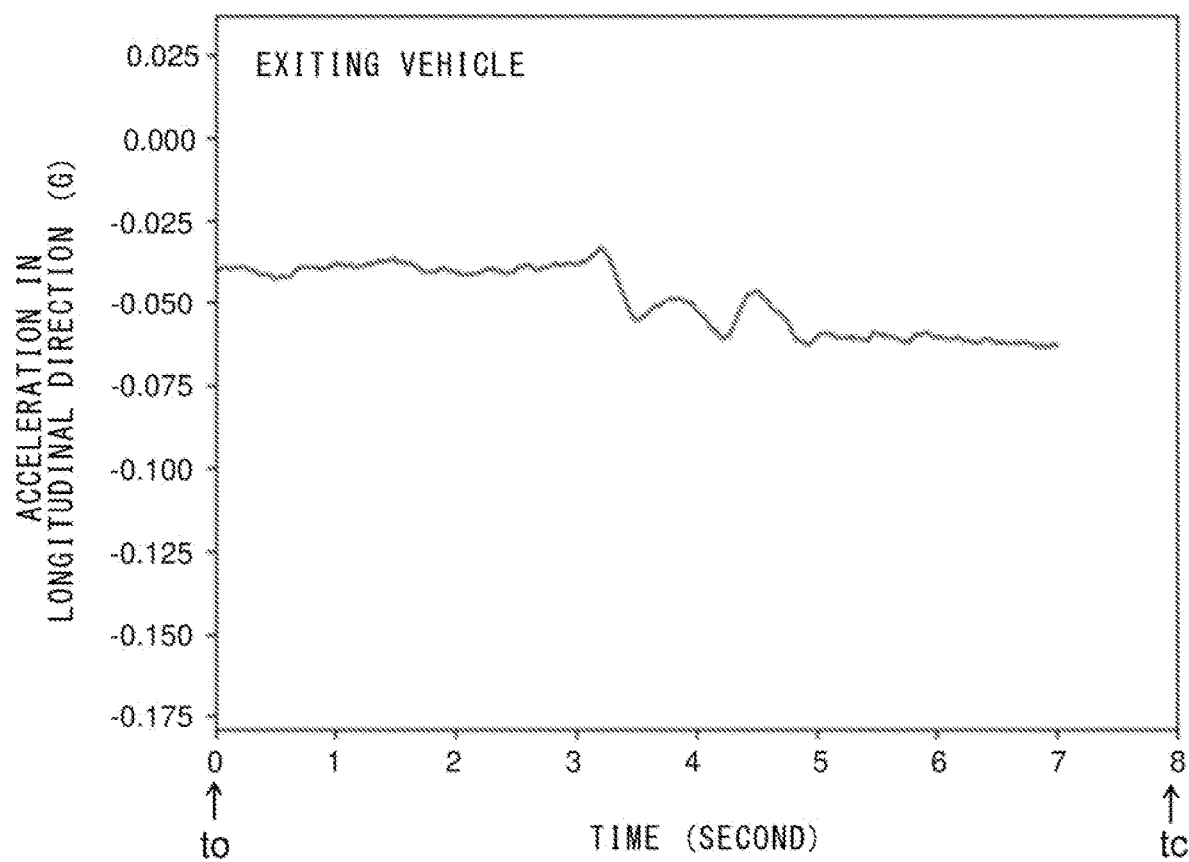
FIG. 7 shows an example of the moving average of the time series data for acceleration of FIG. 6.

FIG. 7 shows an example of the moving average of the time series data for acceleration of FIG. 6. Illustration of the regression line is omitted. The acceleration is on the decrease, and the indicator X is negative. Therefore, the determination unit 18 determines that a passenger gets off the vehicle.

When the determination unit 18 determines that a passenger gets on or gets off the vehicle, the determination unit 18 supplies the result of detection to the output unit 20. The time when the passenger gets on or gets off the vehicle is appended to the result of detection.

The output unit 20 outputs the result of detection to a predetermined server apparatus wirelessly via a network such as the Internet. The result of detection may be retrieved by using a recording medium such as a flash memory.

The indicator X may be the amount of variation in the acceleration in the longitudinal direction in the period from the first time point to to the second time point tc.

The form of the regression expression of regression analysis is arbitrary, and it is only required to express the increasing tendency and the decreasing tendency. The regression expression may express the amount of variation in the acceleration. A nonlinear regression expression may be used, and multiple indicators X may be derived. The derivation unit 16 may not derive the moving average and may subject the time series data for acceleration to regression analysis.

Further, the sign of the acceleration detected by the acceleration sensor 6 may be opposite to the one described above, and rearward acceleration may be negative, depending on the direction in which the acceleration sensor 6 is mounted on the vehicle. In this case, the determination unit 18 determines that a passenger gets on the vehicle when the indicator X is smaller than the threshold value and determines that a passenger gets off the vehicle when the indicator X is larger than the threshold value.

Further, the threshold value may include a positive threshold value and a negative threshold value. In this case, the determination unit 18 determines that a passenger gets on the vehicle when the indicator X is larger than the positive threshold value, determines that a passenger gets off the vehicle when the indicator X is smaller than the negative threshold value, and determines that a passenger does not get on or get off the vehicle when the indicator X is not less than the negative threshold value and not more than the positive threshold value. The positive threshold value and the negative threshold value may be determined as appropriate through an experiment or simulation. This reduces the likelihood that it is erroneously determined, when a passenger neither gets on or gets off the vehicle, that a passenger gets on or gets off the vehicle due to an error in detection of the acceleration or an impact from noise.

Figure 8:
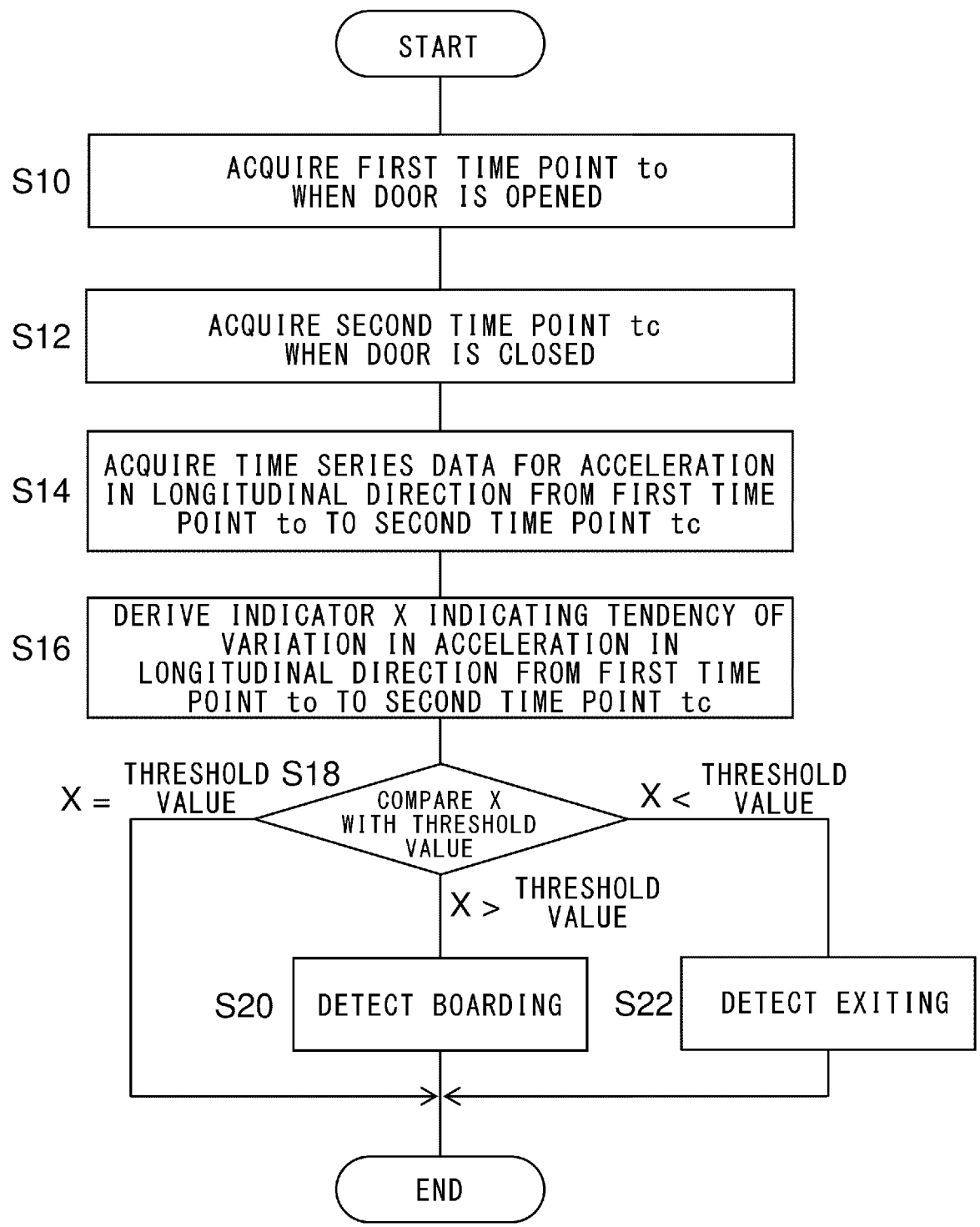
FIG. 8 is a flowchart showing the process of the boarding/exiting detection apparatus of FIG. 1.

FIG. 8 is a flowchart showing the process of the boarding/exiting detection apparatus 10 of FIG. 1. This process is started when the boarding/exiting detection apparatus 10 receives an instruction to start the process and is performed for each pair of the first time point and the second time point.

The first acquisition unit 12 acquires the first time point to when the door is opened (S10) and acquires the second time point tc when the door is closed for the first time after the first time point to (S12). The second acquisition unit 14 acquires time series data for acceleration in the longitudinal direction from the first time point to to the second time point tc (S14), and the derivation unit 16 derives the indicator X indicating the tendency of the variation in the acceleration from the first time point to to the second time point tc (S16).

The determination unit 18 compares the indicator X with the threshold value (S18). When the indicator X is larger than the threshold value, the determination unit 18 detects that a passenger gets on the vehicle (S20) and terminates the process. When the indicator X is smaller than the threshold value, the determination unit 18 determines that a passenger gets off the vehicle (S22) and terminates the process. When the indicator X is equal to the threshold value, the determination unit 18 terminates the process.

According to the embodiment, it is determined that a passenger gets on or gets off the vehicle based on the temporal variation in the acceleration of the vehicle between the first time point, when the door is opened, and the second time point, when the door is closed. Therefore, boarding or exiting can be detected precisely.

The door sensor 2 and the acceleration sensor 6 are existing components of the vehicle. Therefore, the detection system 1 can be configured by mounting the boarding/exiting detection apparatus 10 on the vehicle, and there is no need to add a further sensor to the vehicle. For this reason, the detection system 1 can be configured with a relatively small number of components and at a low cost. Accordingly, boarding or exiting of a passenger can be detected with a simple configuration. Further, intra-vehicular information such as movement of a passenger in the vehicle cabin is not used so that accurate determination can be made irrespective of the situation in the vehicle cabin.

Second Embodiment

The second embodiment differs from the first embodiment in that it is determined that a passenger gets on or gets off the vehicle based on the acceleration in a period of several seconds before and after the first time point and in a period of several seconds before and after the second time point. The difference from the first embodiment will be highlighted below.

Figure 9:
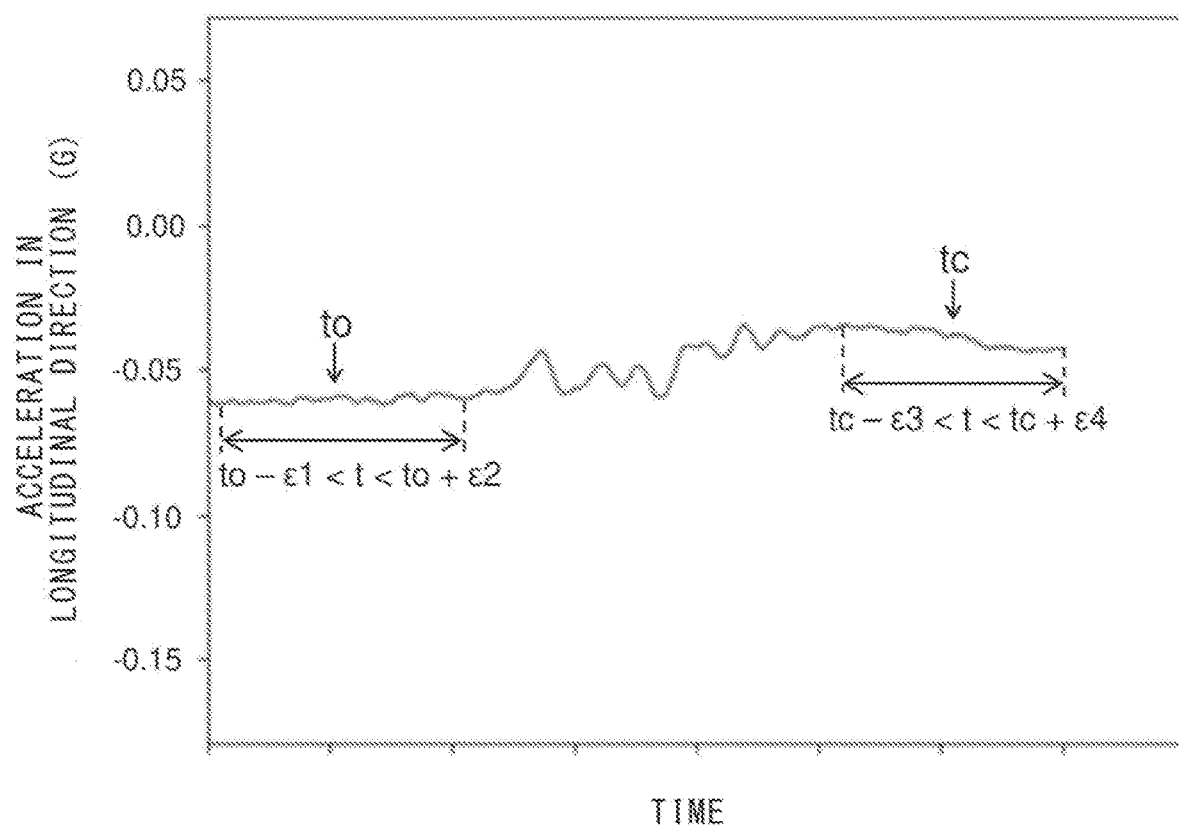
FIG. 9 is a chart for explaining a period of acquisition of the time series data for acceleration of the second embodiment.

FIG. 9 is a chart for explaining a period of acquisition of the time series data for acceleration of the second embodiment. The second acquisition unit 14 acquires the time series data for acceleration in the longitudinal direction in the first period between to−ε1 and to+ε2 defined based on the first time point to and in the second period between tc−ε3 and tc+ε4 defined based on the second time point tc. The first period and the second period do not concur.

Each of ε1, ε2, ε3, and ε4 is a predefined real value in a range not less than zero seconds and not more than several seconds and can be determined as appropriate through an experiment or simulation. ε2 and ε3 are preferably set to exclude a period in which the acceleration varies due to boarding/exiting of a passenger. ε2 and ε3 may be set to zero so that the first period is a period immediately before the first time point to and the second period is a period immediately after the second time point tc. ε1 and ε4 are preferably set to exclude a period in which the vehicle is being braked or driven to produce acceleration. ε1 and ε4 may be set to zero so that the first period is a period immediately after the first time point to and the second period is a period immediately before the second time point tc.

The derivation unit 16 derives the difference between the statistical value of the time series data for acceleration in the first period and the statistical value of the time series data for acceleration in the second period as the indicator X. The statistical value may be an average value, a median value, etc. A moving average need not be derived. The indicator X represents the amount of variation in the acceleration in the longitudinal direction in the period from the first time point to to the second time point tc.

Figure 10:
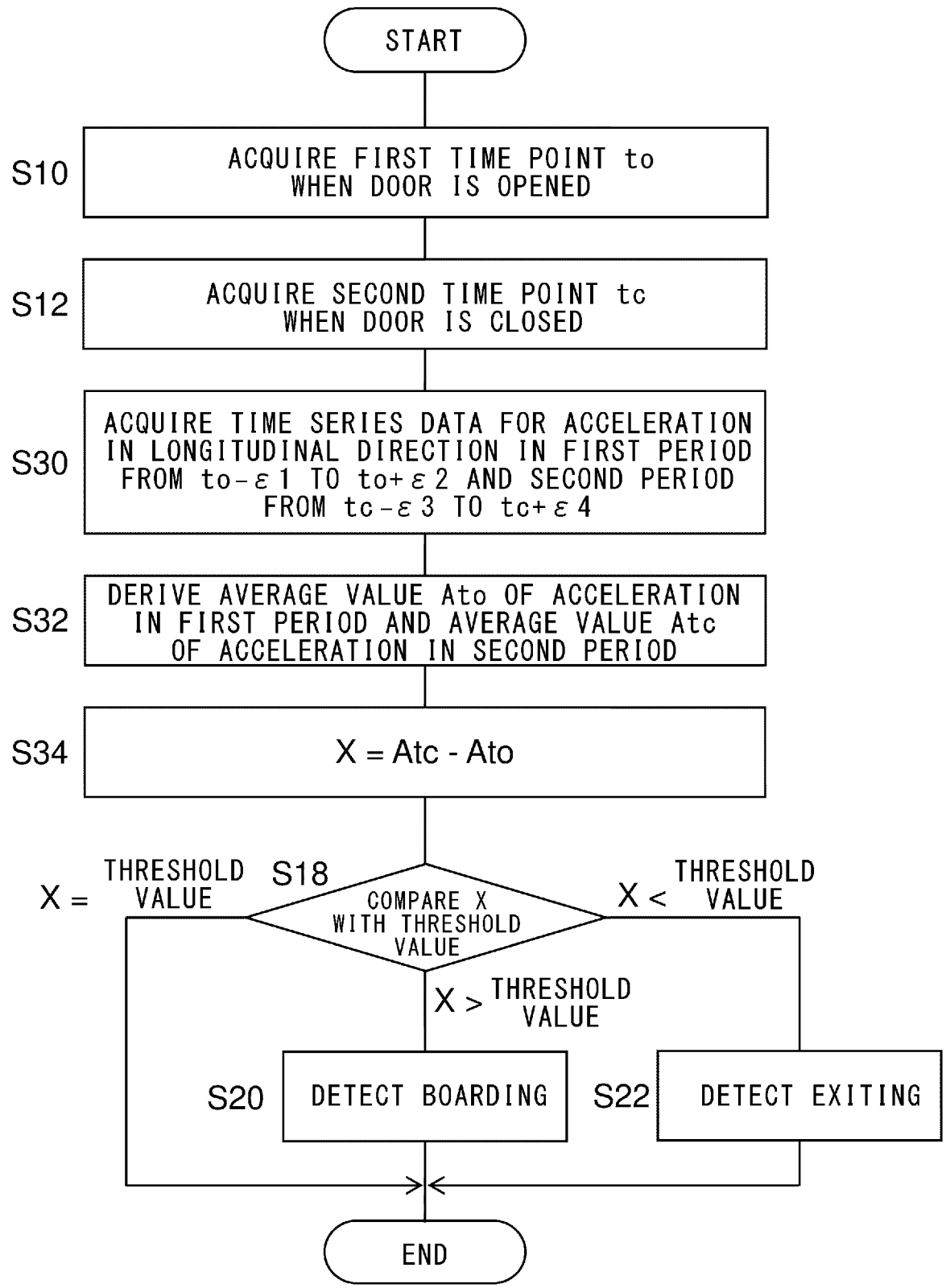
FIG. 10 is a flowchart showing the process of the boarding/exiting detection apparatus of the second embodiment.

FIG. 10 is a flowchart showing the process of the boarding/exiting detection apparatus 10 of the second embodiment. The processes in S10 and S12 are identical to those of FIG. 8. Following S12, the second acquisition unit 14 acquires the time series data for acceleration in the longitudinal direction in the first period from to−ε1 to to+ε2 and the second period from tc−ε3 to tc+ε4 (S30). The derivation unit 16 derives an average value Ato of the acceleration in the first period and an average value Atc of the acceleration in the second period (S32), derives the indicator X=Atc−Ato (S34), and moves to the process in S18. The process after S18 is identical to that of FIG. 8.

According to the embodiment, a determination is made without using the acceleration which increases or decreases heavily due to boarding/exiting. Accordingly, it is easy to detect that a passenger gets on the vehicle precisely, even in a situation in which a passenger gets on the vehicle, then exits the vehicle temporarily, and then gets on the vehicle again in a period between the opening of the door and the closing thereof. It is also easy to detect that a passenger gets off the vehicle precisely even in a situation in which a passenger gets off the vehicle, then gets on the vehicle again to pick up a thing left behind, and then gets off the vehicle again in a period between the opening of the door and the closing thereof.

Third Embodiment

The third embodiment differs from the first embodiment in that acquisition of the acceleration is started when the door is opened and acquisition of the acceleration is terminated when the door is closed. Hereinafter, the difference from the first embodiment will be mainly described.

The first acquisition unit 12 acquires information indicating whether the door is in an open state or in a closed state from the door sensor 12 and supplies the acquired information to the second acquisition unit 14.

The second acquisition unit 14 starts acquiring the acceleration data from the acceleration sensor 6 when the closed door is opened and stops acquiring the acceleration data when the open door is closed, based on the information supplied from the first acquisition unit 12. The acceleration data acquired is the latest data at the time point of acquisition. In other words, the second acquisition unit 14 acquires the time series data for acceleration in a period from the first time point when the door is opened to the second time point when the door is closed. The second acquisition unit 14 supplies the acquired time series data for acceleration to the derivation unit 16.

The derivation unit 16 and the determination unit 18 perform the process of the first embodiment. The derivation unit 16 may perform the process of the second embodiment, defining that ε1=ε4=0.

Figure 11:
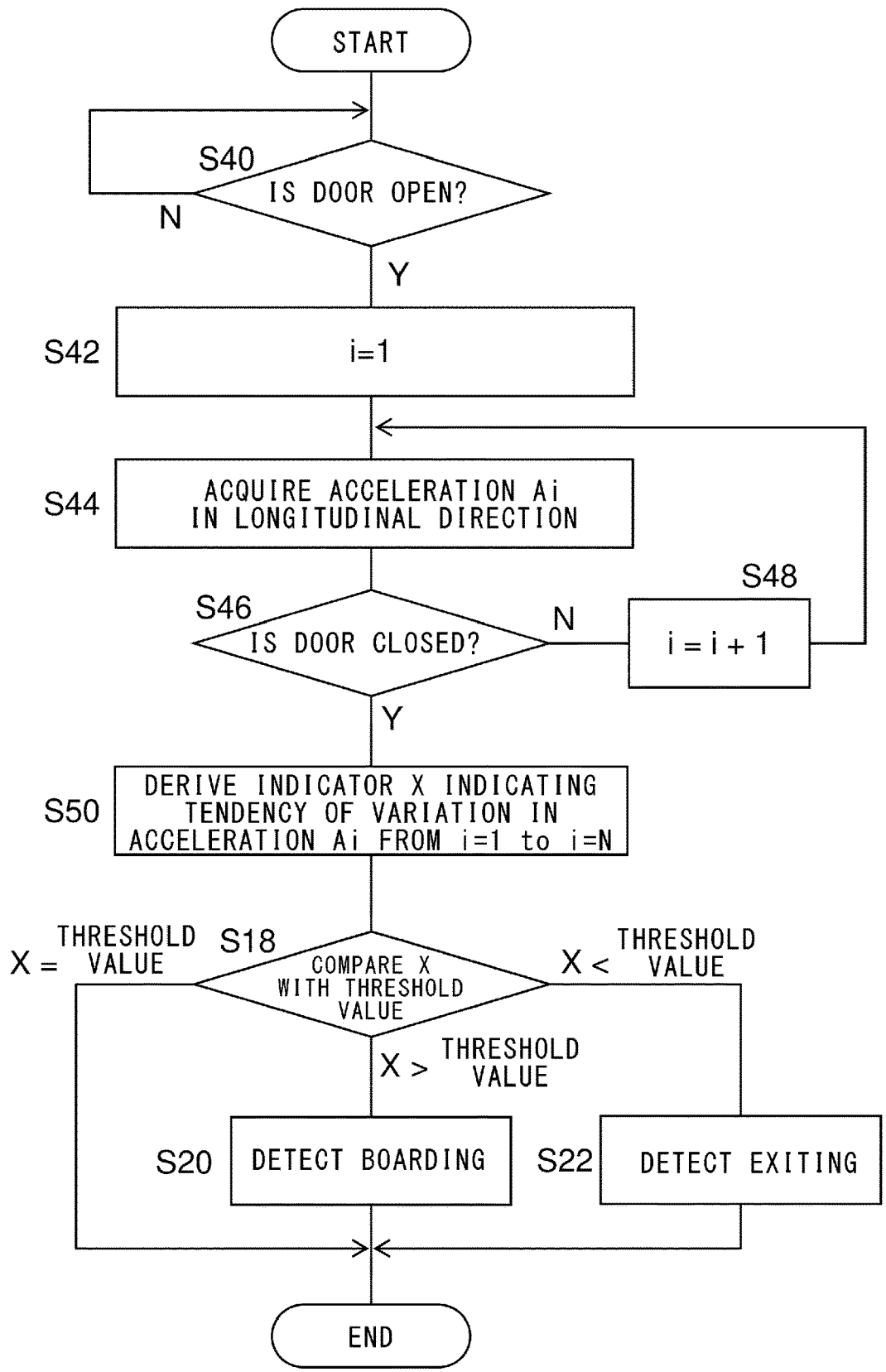
FIG. 11 is a flowchart showing the process of the boarding/exiting detection apparatus 10 of the third embodiment.

FIG. 11 is a flowchart showing the process of the boarding/exiting detection apparatus 10 of the third embodiment. The process is performed repeatedly. When the door is not open (N in S40), control returns to S40. When the door is opened (Y in S40), the second acquisition unit 14 sets i such that i=1 (S42), acquires the acceleration Ai in the longitudinal direction (S44). When the door is not closed (N in S46), the second acquisition unit 14 adds 1 to current i (S48) and returns to S44. When the door is closed (Y in S46), the derivation unit 16 derives the indicator X indicating the tendency of the variation in the acceleration Ai from i=1 to i=N (S50) and moves to the process in S18. The value of i at the time point when the door is closed is denoted by N. The process after S18 is identical to that of FIG. 8.

According to the embodiment, it is possible to detect that a passenger gets on or gets off the vehicle immediately.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

In the embodiment, an example is described in which boarding or exiting in the rear seat of the vehicle is determined. The determination unit 18 may detect boarding or exiting in the driver's seat or the front passenger seat in addition to the rear seat or instead of the rear seat. In the case the acceleration in the transversal direction of the vehicle varies as a passenger gets on the vehicle to be seated in the driver's seat or the front passenger seat, the determination unit 18 may determine that a passenger gets on or gets off the vehicle based on the variation in the acceleration in the transversal direction.

In the first embodiment and the second embodiment, the first retention unit 4 and the second retention unit 8 may be provided in the boarding/exiting detection apparatus 10.

In the embodiment, an example is described in which the boarding/exiting detection apparatus 10 is mounted on the vehicle. The boarding/exiting detection apparatus 10 may be included in a server on a cloud. In this case, the wireless communication apparatus (not shown) mounted on the vehicle transmits information relating to whether the door is open or closed and the time series data for acceleration to the boarding/exiting detection apparatus 10 in the server, and the boarding/exiting detection apparatus 10 transmits the result of detection of boarding or exiting to the terminal apparatus of a taxi company or the vehicle-mounted apparatus of the vehicle or the like.

In the embodiment, an example in which the vehicle is a taxi is described, but the vehicle may be a bus of a kindergarten or the like. The vehicle may be a truck provided with a door in the luggage carrier and configured to carry a luggage. In this case, the determination unit 18 determines that the vehicle is loaded or unloaded instead of determining boarding or exiting of a passenger. In other words, the determination unit 18 detects that the vehicle is loaded or unloaded depending on whether the acceleration is on the increase or on the decrease in a period in which the door is open.

What is claimed is:

1. A detection apparatus comprising:
   an acquisition unit configured to acquire an acceleration of a vehicle in a period determined based on a first time point when a door of the vehicle is opened and a second time point when the door is closed after the first time point;

a determination unit configured to determine that a passenger of the vehicle gets on or gets off the vehicle, based on a temporal variation in the acceleration acquired; and a derivation unit, wherein the acquisition unit acquires the acceleration in a period from the first time point to the second time point, and the determination unit determines that the passenger gets on or gets off the vehicle in accordance with whether the acceleration increases or decreases in the period from the first time point to the second time point, the derivation unit derives an indicator indicating a tendency of the temporal variation in the acceleration in a longitudinal direction in the period from the first time point and the second time point and supplies the derived indicator to the determination unit, the indicator indicates whether the acceleration in this period is increasing or decreasing, and the indicator shows a tendency of variation in a pitching angle θ of the vehicle in this period.

2. A detection apparatus comprising:

a first acquisition unit configured to acquire an acceleration of a vehicle in a period determined based on a first time point when a door of the vehicle is opened and a second time point when the door is closed after the first time point;

a second acquisition unit;

a determination unit configured to determine that a passenger of the vehicle gets on or gets off the vehicle, based on a temporal variation in the acceleration acquired, wherein the first acquisition unit acquires the acceleration in a first period defined based on the first time point and a second period defined based on the second time point, the determination unit determines that the passenger gets on or gets off the vehicle based on a difference between a statistical value of the acceleration in the first period and a statistical value of the acceleration in the second period, the second acquisition unit acquires time series data for acceleration in a longitudinal direction in the first period defined based on the first time point to and in the second period defined based on the second time point, and the first period and the second period do not overlap.

3. The detection apparatus according to claim 1, wherein the determination unit is further configured to determine that the vehicle is loaded with cargo or that the cargo is unloaded from the vehicle.

4. A detection method comprising:

acquiring an acceleration of a vehicle in a period determined based on a first time point when a door of the vehicle is opened and a second time point when the door is closed after the first time point; and determining that a passenger of the vehicle gets on or gets off the vehicle, based on a temporal variation in the acceleration acquired;

deriving an indicator indicating a tendency of the temporal variation in the acceleration in a longitudinal direction in the period from the first time point and the second time point, wherein the indicator indicates whether the acceleration in this period is increasing or decreasing, and the indicator shows a tendency of variation in a pitching angle θ of the vehicle in this period.

5. The detection apparatus according to claim 1, wherein the derivation unit derives a moving average in a predetermined segment in time series data for acceleration between the first time point and the second time point, subjects the time series data for the derived moving average to regression analysis, and derives a regression line L1 given by y=ax+b, and the derivation unit defines an inclination a of the regression line L1 as the indicator.

6. The detection apparatus according to claim 2, wherein the first period and the second period are set to exclude a period in which the acceleration varies due to boarding or exiting of a passenger.

7. The detection apparatus according to claim 2, wherein the first period and the second period are set to exclude a period in which the vehicle is being braked or driven to produce acceleration.

8. The detection apparatus according to claim 2, wherein the determination unit is further configured to determine that the vehicle is loaded with cargo or that the cargo is unloaded from the vehicle.

9. The detection apparatus according to claim 1, wherein the acquisition unit, the determination unit, and the derivation unit are each implemented with a hardware processor.

10. The detection apparatus according to claim 2, wherein the first acquisition unit, the determination unit, and the second acquisition unit are each implemented with a hardware processor.

* * * * *